US009766842B2

(12) United States Patent
Oshiumi

(10) Patent No.: US 9,766,842 B2
(45) Date of Patent: Sep. 19, 2017

(54) PROCESSING APPARATUS, INFORMATION APPARATUS, SYSTEM, NON-TRANSITORY COMPUTER READABLE MEDIUM, AND METHOD

(71) Applicant: FUJI XEROX CO., LTD., Minato-ku, Toyko (JP)

(72) Inventor: Makoto Oshiumi, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/219,184

(22) Filed: Mar. 19, 2014

(65) Prior Publication Data

US 2015/0029526 A1 Jan. 29, 2015

(30) Foreign Application Priority Data

Jul. 23, 2013 (JP) .................................. 2013-153033

(51) Int. Cl.
H04N 1/04 (2006.01)
G06F 3/12 (2006.01)
H04N 1/00 (2006.01)

(52) U.S. Cl.
CPC .......... *G06F 3/1225* (2013.01); *G06F 3/1204* (2013.01); *G06F 3/1292* (2013.01); *H04N 1/00204* (2013.01); *H04N 2201/006* (2013.01); *H04N 2201/0094* (2013.01)

(58) Field of Classification Search
CPC ...... G06F 3/1225; G06F 3/1204; G06F 3/292; H04N 1/00127
USPC ...................................... 358/1.13, 1.14, 1.15
See application file for complete search history.

(56) References Cited

U.S. PATENT DOCUMENTS

| | | | |
|---|---|---|---|
| 5,812,762 A * | 9/1998 | Kim ................................. 726/20 |
| 5,836,010 A * | 11/1998 | Kim ................................. 726/20 |
| 7,345,779 B2 * | 3/2008 | Tamai et al. ................. 358/1.15 |
| 2004/0164166 A1 * | 8/2004 | Mahany et al. ......... 235/472.02 |
| 2004/0196474 A1 * | 10/2004 | Ikegawa ............ G06K 15/1856 358/1.8 |
| 2009/0201544 A1 * | 8/2009 | Kumakura et al. .......... 358/1.15 |
| 2009/0316179 A1 * | 12/2009 | Amiya et al. ................ 358/1.14 |
| 2010/0287546 A1 * | 11/2010 | Harano ......................... 717/176 |
| 2011/0235115 A1 | 9/2011 | Nishio |

(Continued)

FOREIGN PATENT DOCUMENTS

| JP | 09226206 A * | 9/1997 |
| JP | 2011-8386 A | 1/2011 |
| JP | 2011-203856 A | 10/2011 |

OTHER PUBLICATIONS

Kurosawa, Hidenori, JP 09226206, Sep. 1997 ELMT (English Lauguage Machine Translated).*

(Continued)

*Primary Examiner* — Houshang Safaipour
(74) *Attorney, Agent, or Firm* — Sughrue Mion, PLLC

(57) ABSTRACT

A system includes a processing apparatus, and an information apparatus. The processing apparatus includes a first communication unit that transmits identification information of the processing apparatus to the information apparatus. The information apparatus includes a second communication unit that receives the identification information transmitted by the first communication unit, and a driver installing unit to install a driver for controlling the processing apparatus corresponding to the identification information.

13 Claims, 8 Drawing Sheets

(56) References Cited

U.S. PATENT DOCUMENTS

2011/0292445 A1* 12/2011 Kato ........................... 358/1.15
2012/0005470 A1* 1/2012 Oyasato ................ G06F 9/4416
　　　　　　　　　　　　　　　　　　　　　　　　713/2

OTHER PUBLICATIONS

Communication dated Aug. 2, 2016 from the Japanese Patent Office in counterpart Application No. 2013-153033.

* cited by examiner

PROCESSING APPARATUS, INFORMATION APPARATUS, SYSTEM, NON-TRANSITORY COMPUTER READABLE MEDIUM, AND METHOD

CROSS-REFERENCE TO RELATED APPLICATIONS

This application is based on and claims priority under 35 USC 119 from Japanese Patent Application No. 2013-153033 filed Jul. 23, 2013.

BACKGROUND (i) Technical Field

The present invention relates to a processing apparatus, an information apparatus, a system, a non-transitory computer readably medium, and a method.

(ii) Related Art

In related art, for example, processing apparatuses such as multifunction machines including a print function, a scan function, and the like are known which are connected to a communication network such as a local area network (LAN), and transmit and receive data to and from an information apparatus such as a personal computer via the communication network. In order to transmit and receive data via a communication network, it is necessary to acquire identification information such as an IP address assigned to the processing apparatus, in advance, and install a driver for the processing apparatus on the information apparatus.

SUMMARY

According to an aspect of the invention, there is provided a system including a processing apparatus, and an information apparatus. The processing apparatus includes a first communication unit that transmits identification information of the processing apparatus to the information apparatus. The information apparatus includes a second communication unit that receives the identification information transmitted by the first communication unit, and a driver installing unit to install a driver for controlling the processing apparatus corresponding to the identification information.

BRIEF DESCRIPTION OF THE DRAWINGS

Exemplary embodiments of the present invention will be described in detail based on the following figures, wherein.

DETAILED DESCRIPTION

Hereinafter, exemplary embodiments of the invention will be described with reference to the drawings.

Figure 1:
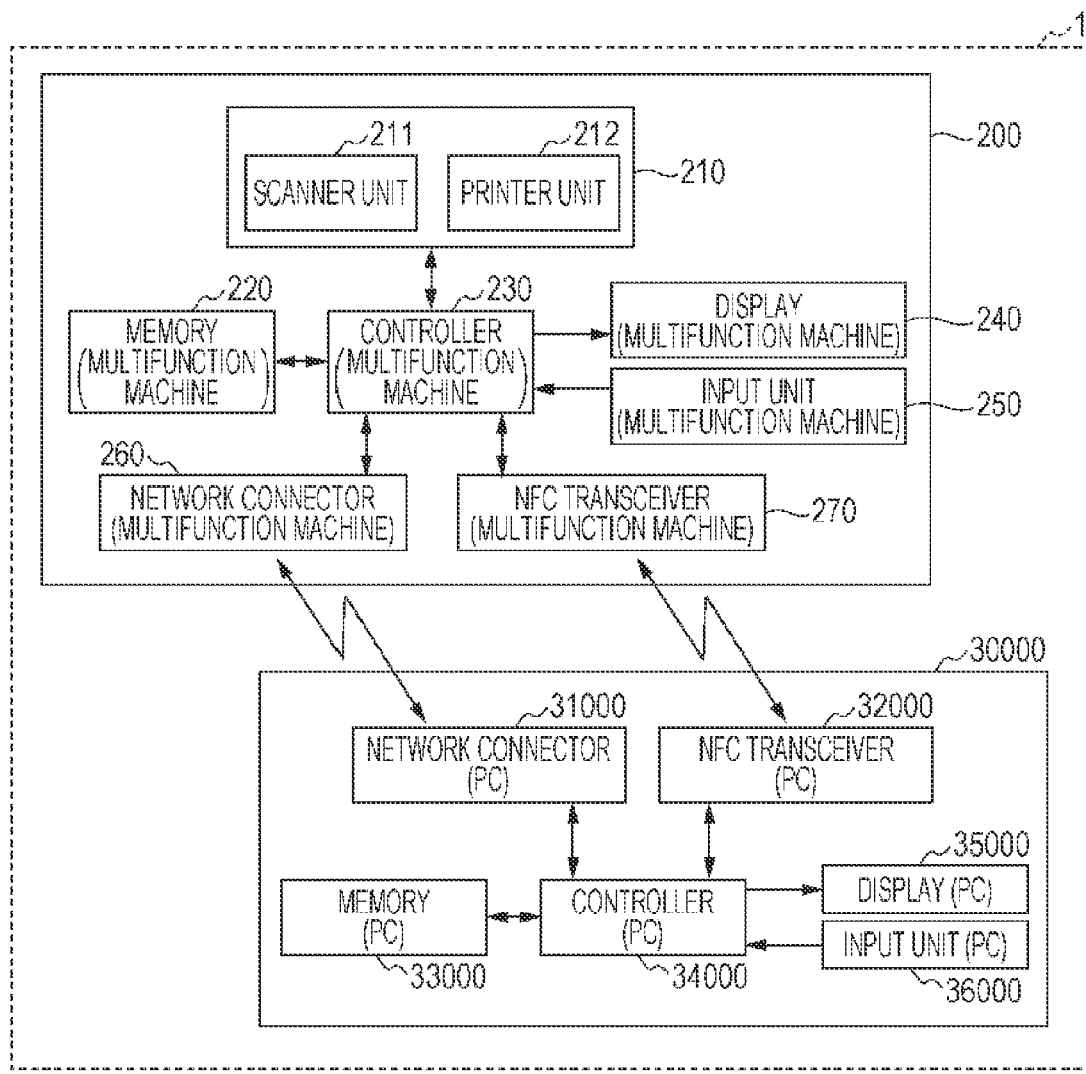
FIG. 1 is a block diagram of an image forming system according to exemplary embodiments of the invention.

FIG. 1 illustrates an example of configuration of an image forming system 1 according to an exemplary embodiment of the invention. The image forming system 1 includes a multifunction machine 200 and a personal computer (PC) 30000.

The multifunction machine 200 includes a multifunction machine body 210, a memory (multifunction machine) 220, a controller (multifunction machine) 230, a display (multifunction machine) 240, an input unit (multifunction machine) 250, a network connector (multifunction machine) 260, and an NFC transceiver (multifunction machine) 270. The controller (multifunction machine) 230, the memory (multifunction machine) 220, the display (multifunction machine) 240, and the input unit (multifunction machine) 250 function integrally as a computer.

The multifunction machine body 210 includes a scanner unit 211 and a printer unit 212. The multifunction machine body 210 may additionally include a facsimile unit or the like.

The memory (multifunction machine) 220 includes, for example, a random access memory (RAM) or a read only memory (ROM). The memory (multifunction machine) 220 stores a program executed by the controller (multifunction machine) 230, and also functions as a work memory for the controller (multifunction machine) 230. The program to be executed by the controller (multifunction machine) 230 which is stored in the memory (multifunction machine) 220 may be either provided via an electrical communication line, or may be provided while being stored on a computer readable information storage medium such as a semiconductor storage device.

The controller (multifunction machine) 230 includes, for example, a central processing unit (CPU). The controller (multifunction machine) 230 controls the entire multifunction machine 200 by executing the program stored in the memory (multifunction machine) 220.

The display (multifunction machine) 240 is, for example, a liquid crystal display. The display (multifunction machine) 240 displays information or the like necessary for the user to operate the multifunction machine 200.

The input unit (multifunction machine) 250 is, for example, a physical ten key or a touch panel. The input unit (multifunction machine) 250 outputs an instruction from the user to the controller (multifunction machine) 230.

The network connector (multifunction machine) 260 is a wireless LAN device in the exemplary embodiments. Alternatively, the network connector (multifunction machine) 260 may be a network card or the like that establishes a network connection through a wire.

The NFC transceiver (multifunction machine) 270 includes a radio transceiver for conducting radio communications using the near field communication (NFC) technology. Alternatively, for example, an infrared communication unit or a Bluetooth® transceiver may be used.

The NFC technology is a type of short-range radio communication technology and, strictly speaking, refers to a technology defined by ISO/IEC 14443, ISO/IEC 18092, and ISO/IEC 21481, which are international standards established by the International Organization for Standardization (ISO) and the International Electrotechnical Commission (IEC). NFC refers to radio communications using a 13.56-MHz frequency band. NFC assumes communications within a range of several tens of centimeters. Although its communication speed of several hundreds of kbps is low in comparison to communication technologies such as Bluetooth®, NFC does not require initial settings on communication devices such as so-called pairing. Hence, the NFC is a useful technology for cases where it is desired to establish communications easily. In addition, as opposed to communication technologies that have directivity such as infrared communication, NFC is superior in enabling almost omnidirectional transmission/reception. Another feature of NFC resides in that an induced electromotive force generated from electromagnetic waves emitted from one NFC device may be used to secure drive electric power for the other NFC device, and thus transmission/reception is possible even if one of the NFC devices has no power supply. For this reason, NFC transceivers of, for example, a card type are widely used.

The PC 30000 includes a network connector (PC) 31000, an NFC transceiver (PC) 32000, a memory (PC) 33000, a controller (PC) 34000, a display (PC) 35000, and an input unit (PC) 36000.

The network connector (PC) 31000, the NFC transceiver (PC) 32000, the memory (PC) 33000, the controller (PC) 34000, the display (PC) 35000, and the input unit (PC) 36000 have the same configurations as those of the network connector (multifunction machine) 260, the NFC transceiver (multifunction machine) 270, the memory (multifunction machine) 220, the controller (multifunction machine) 230, the display (multifunction machine) 240, and the input unit (multifunction machine) 250, respectively.

However, the display (PC) 35000 is a liquid crystal display or the like with a wide display area in comparison to the display (multifunction machine) 240, and the input unit (PC) 36000 includes a pointing device such as a mouse or a keyboard. Further, control of devices such as the network connector (PC) 31000, control of the CPU, and the like by the controller (PC) 34000 are executed by an operating system (OS). Specific examples of the OS include Windows® from Microsoft, Mac OS® from Apple, and Linux®.

In the exemplary embodiments, the network connector (multifunction machine) 260 and the network connector (PC) 31000 have their own unique media access control (MAC) addresses, which are used as identification information for the data link layer, which is Layer 2 as defined in the Open Systems Interconnection (OSI) reference model (ISO/IEC 7498). In addition, an internet protocol address (IP address) is assigned as identification information in a network, and communications are established by the transmission control protocol (TCP). An IP address refers to identification information used in the network layer, which is Layer 3 in the OSI reference model. TCP refers to a communication procedure used for securing reliability of communications in the transport layer that is Layer 4 in the OSI reference model. However, communications may be performed by using other protocols.

The image forming system 1 according to the exemplary embodiments includes four communication units. The four communication units are the NFC transceiver (multifunction machine) 270 as a first communication unit, the NFC transceiver (PC) 32000 as a second communication unit, the network connector (multifunction machine) 260 as a third communication unit, and the network connector (PC) 31000 as a fourth communication unit.

Figure 2:
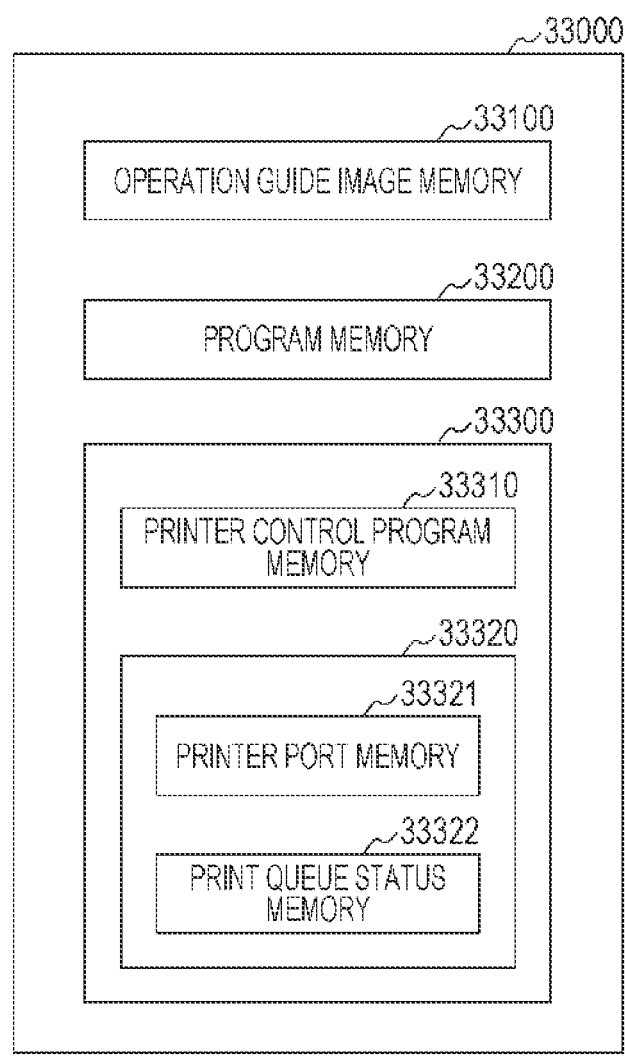
FIG. 2 illustrates the contents of a memory on a PC according to exemplary embodiments of the invention.

FIG. 2 illustrates an example of the contents of the memory (PC) 33000 according to the exemplary embodiments. The memory (PC) 33000 includes an operation guide image memory 33100, a program memory 33200, and a printer configuration information memory 33300. The printer configuration information memory 33300 includes a printer control program memory 33310 and a printer control information memory 33320. The printer control information memory 33320 includes a printer port memory 33321 and a print queue status memory 33322.

Programs necessary for controlling the PC 30000 are stored in the program memory 33200. Examples of such programs include the above-mentioned OS and a device driver. A device driver refers to a program prepared for each individual device in cases where, for example, a peripheral devices such as a keyboard is to be controlled by the OS, in order to provide abstraction of the functions provided by the device so that the device may be controlled without considering the electrical specifications of the device. However, for commonplace devices such as keyboards, the OS usually includes device drivers for the corresponding devices. Such drivers are called "standard drivers" or "In-Box drivers".

The printer control program memory 33310 stores programs necessary for printer control, including a printer driver. While the printer driver is a standard driver included in the OS in the exemplary embodiments, the printer driver may be a dedicated driver.

The printer port memory 33321 stores an IP address assigned to the network connector (multifunction machine) 260. While the multifunction machine 200 includes the network connector (multifunction machine) 260 in the exemplary embodiments, the multifunction machine 200 may be connected to a network via a separate printer server. In that case, an IP address assigned to the printer server is stored in the printer port memory 33321.

The print queue status memory 33322 stores a print queue status generated when a printer driver is installed onto the OS. A print queue status refers to, for example, a print-ready status or suspend status.

Figure 3:
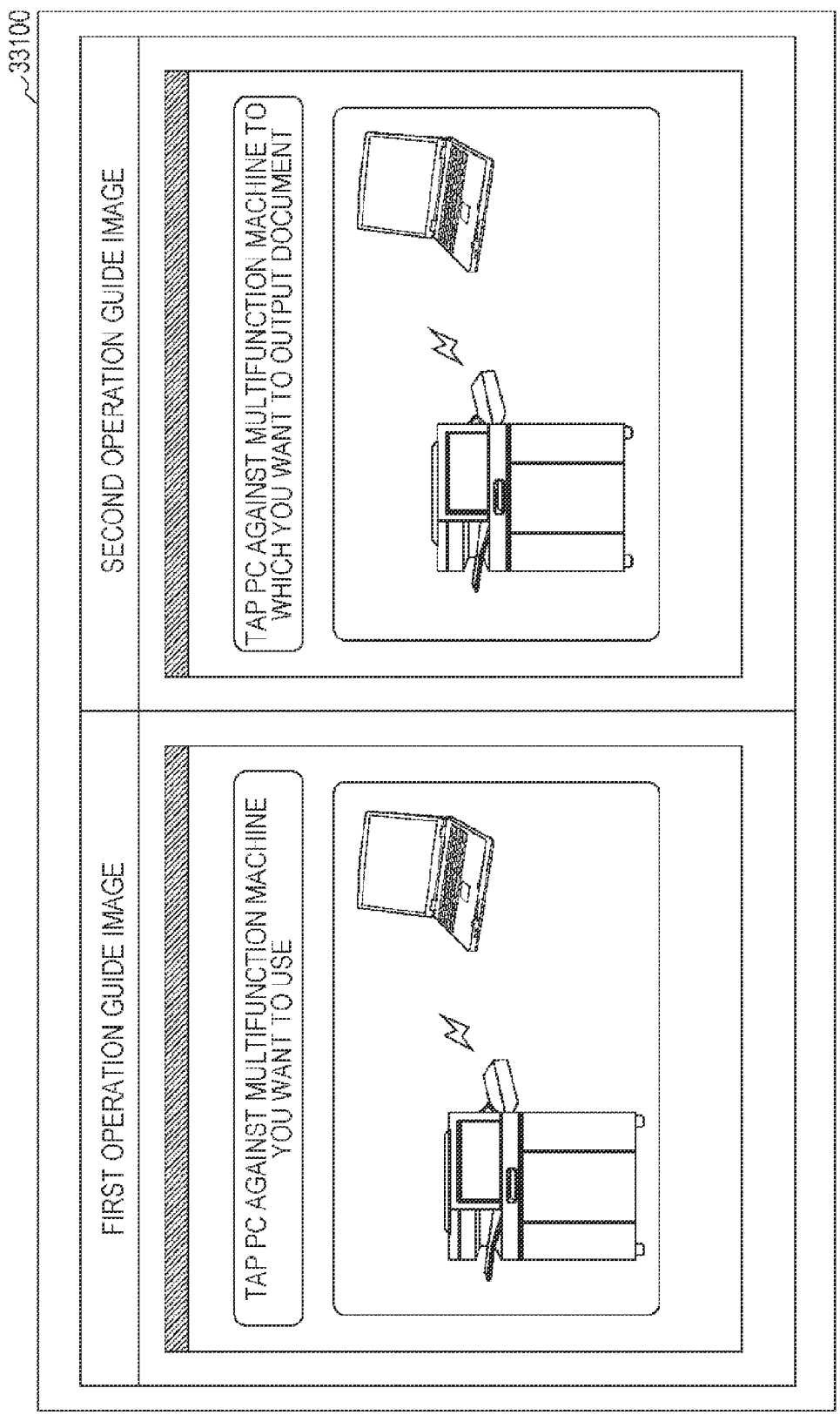
FIG. 3 illustrates the contents of an operation guide image memory according to exemplary embodiments of the invention.

FIG. 3 illustrates operation guide images stored in the operation guide image memory 33100. In the exemplary embodiments, a first operation guide image and a second operation guide image are stored in the operation guide image memory 33100. These images are called up in a printer setup program or a print job monitoring program descried later, and displayed on the display (PC) 35000.

Exemplary Embodiment 1

Figure 4:
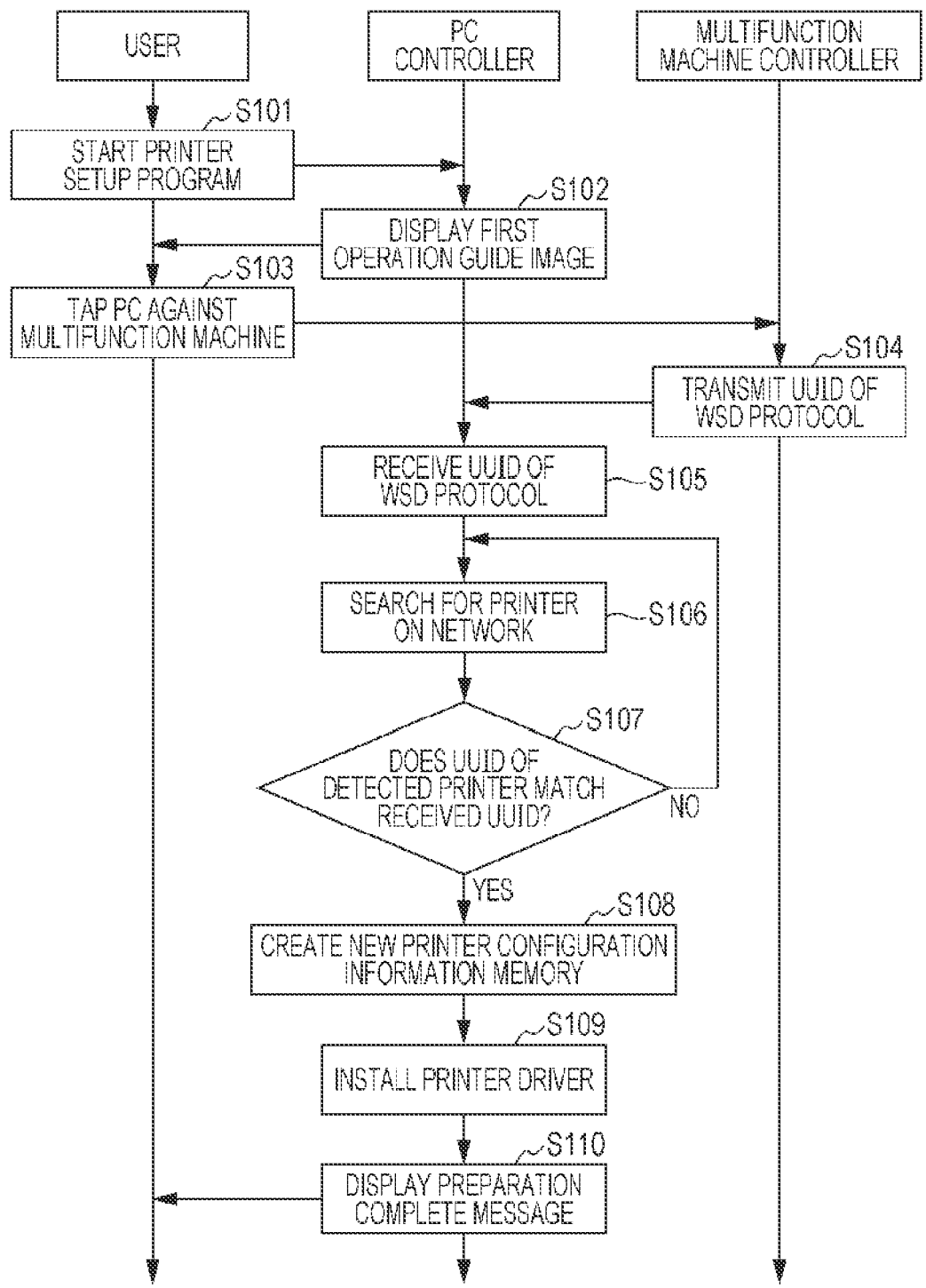
FIG. 4 is a flowchart illustrating an example of program processing in an image forming system according to a first exemplary embodiment of the invention.

Hereinafter, a first exemplary embodiment of the invention will be described. FIG. 4 illustrates, in time series, user's actions, and processing executed in the controller (PC) 34000 and the controller (multifunction machine) 230 according to the first exemplary embodiment.

First, as the user operates the input unit (PC) 36000, the controller (PC) 36000 starts a printer setup program stored in the printer control program memory 33310 (S101). The program may be stored in the printer control program memory 33310 in advance, or may be acquired via an electrical communication line as required. Alternatively, the program may be provided while being stored on a computer readable information storage medium such as a semiconductor storage device.

Next, the controller (PC) 36000 uses the display (PC) 35000 to display a first operation guide image 40a stored in the operation guide image memory 33100 (S102).

Figure 5:
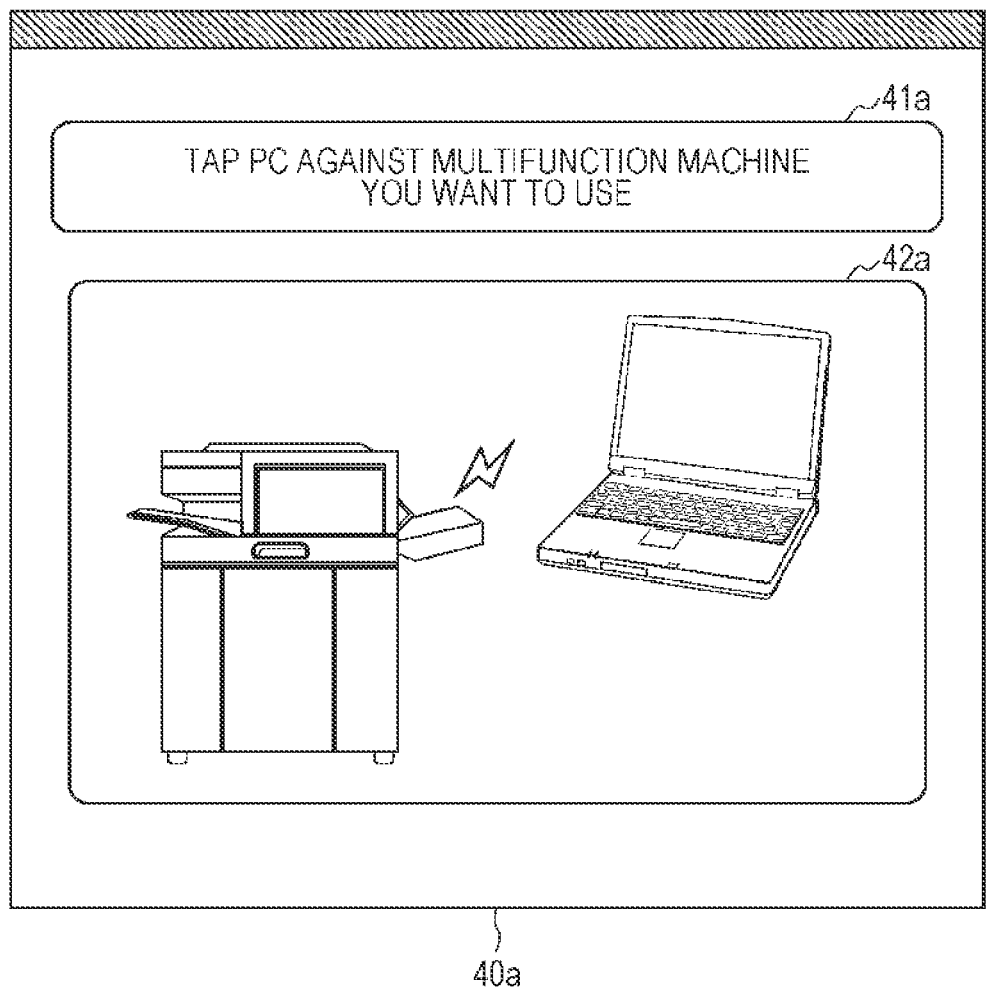
FIG. 5 illustrates an example of display of an operation guide image according to the first exemplary embodiment of the invention.

FIG. 5 illustrates the first operation guide image 40a. The first operation guide image 40a includes a first message window 41a, and a first operation guide display window 42a. In the first exemplary embodiment, the letters "Tap the PC against the multifunction machine you want to use" are displayed in the first message display window 41a, and a drawing indicative of this instruction is displayed in the first operation guide display window 42a.

In this regard, "tap" refers to bringing the PC 30000, particularly its NFC transceiver (PC) 32000 into contact with, or into close proximity within a range of several tens of centimeters to, the NFC transceiver (multifunction machine) 270 of the multifunction machine 200, and keeping the state for several seconds to enable communication by NFC.

After seeing this guide image, the user taps the PC 30000 against the multifunction machine 200 (S103). At this time, it is necessary for the user to know where the NFC transceiver (PC) 32000 and the NFC transceiver (multifunction machine) 270 are mounted. Accordingly, visibility of those transceivers by the user may be enhanced by, for example, causing the corresponding portions to emit light.

Once communication by NFC becomes possible, the controller (multifunction machine) 230 transmits the universally unique identifier (UUID) of the Web Services on Devices (WSD) protocol described later by the NFC transceiver (multifunction machine) 270 (S104). The UUID is a unique identifier defined in ISO/IEC 11578:1996. The UUID may be computed on the basis of the MAC address of the network connector (multifunction machine) 260, or may be computed on the basis of random numbers or the like.

The NFC transceiver (PC) 32000 receives the UUID transmitted by the NFC transceiver (multifunction machine) 270 (S105). At this time, the NFC transceiver (PC) 32000 may emit sound or light to inform the user of completion of the reception. In a case where the reception fails, the NFC transceiver (PC) 32000 may notify the user to that effect.

While the PC 30000 is directly tapped against the multifunction machine 200 in the first exemplary embodiment, it is also possible to receive an UUID by tapping an NFC device of, for example, a card type against the multifunction machine 200, store the UUID into a memory provided in the NFC device, and thereafter tap the NFC device against the PC 30000 so that the NFC transceiver (PC) 32000 receives the UUID.

Next, the controller (PC) 34000 searches for a printer on the network (S106), and determines whether or not the UUID of the detected printer matches the UUID received by the NFC transceiver (PC) 32000 (S107). In a case where these UUIDs do not match, the controller (PC) 34000 searches for the presence of another printer on the network.

In a case where a printer with the matching UUID is detected, the controller (PC) 34000 secures a memory area within the memory (PC) 33000, and creates a new printer configuration information memory 33300 (S108). Multiple printer configuration information memories may be included in the memory (PC) 33000.

Thereafter, the controller (PC) 34000 installs a printer driver into the printer control program memory included in the newly created printer configuration information memory 33300 (S109). In the first exemplary embodiment, a standard driver is selected by using WSD on the basis of an acquired UUID, and the selected driver is installed. In this regard, WSD is a type of application programming interface (API) provided by Microsoft, which facilitates, for example, detection and connection of a printer and the like on a network. This driver may be either stored in the memory (PC) 33000 in advance, or acquired via an electrical communication line. Alternatively, the driver may be provided while being stored on a computer readable information storage medium.

Lastly, the controller (PC) 34000 uses the display (PC) 35000 to display a message that informs completion of preparations (S110). This ends the printer setup program according to the first exemplary embodiment.

While the first exemplary embodiment mentioned above is directed to the case in which a printer driver is installed in order to use the printer unit 212 of the multifunction machine 200, a scanner driver may be installed in order to use the scanner unit 211. In that case, the controller (PC) 34000 searches for a scanner on the network (S106), determines whether or not UUIDs match (S107), creates a scanner configuration information memory (S108), and installs a scanner driver (S109). The controller (PC) 34000 may install both of a print driver and a scanner driver, or may install a program necessary for using another function included in the multifunction machine 200.

Exemplary Embodiment 2

Figure 6:
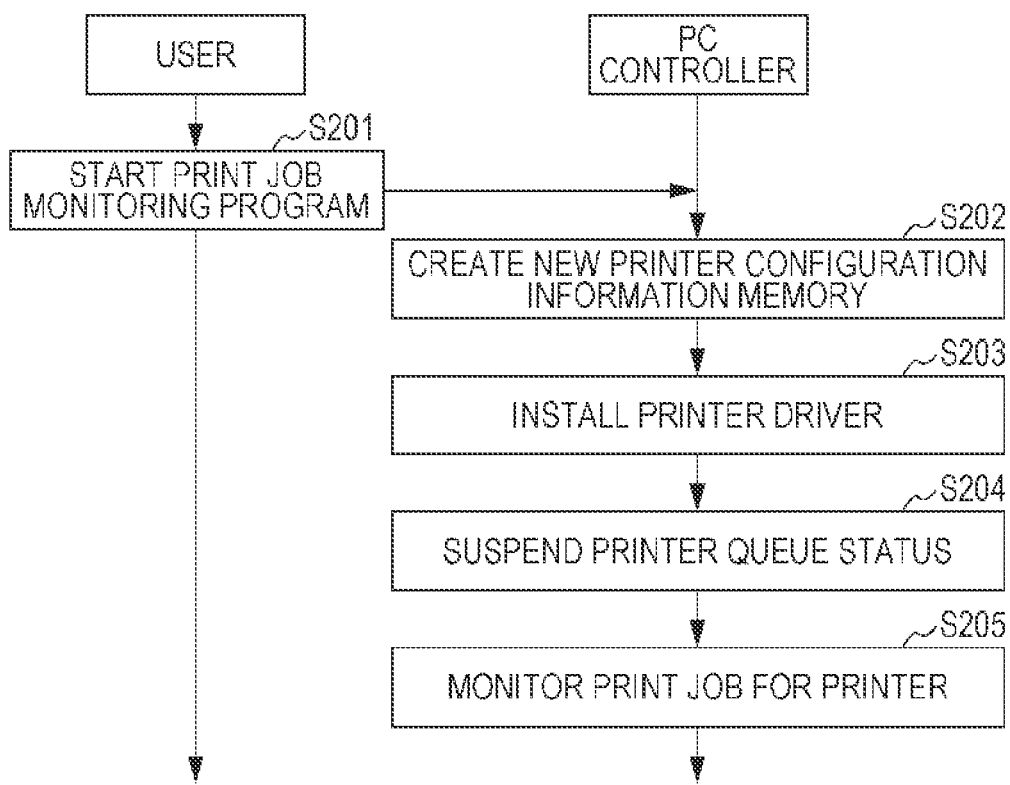
FIG. 6 is a flowchart illustrating an example of program processing in an image forming system according to a second exemplary embodiment of the invention.

Next, a second exemplary embodiment of the invention will be described. FIG. 6 illustrates, in time series, user's actions, and processing executed in the controller (PC) 34000, in a preparation step according to the second exemplary embodiment.

First, as the user operates the input unit (PC) 36000, the controller (PC) 36000 starts a print job monitoring program stored in the printer control program memory 33310 (S201). The program may be stored in the printer control program memory 33310 in advance, or may be acquired via an electrical communication line as required. Alternatively, the program may be provided while being stored on a computer readable information storage medium such as a semiconductor storage device.

Next, the controller (PC) 34000 secures a memory area within the memory (PC) 33000, and creates a new printer configuration information memory 33300 (S202).

Thereafter, the controller (PC) 34000 installs a printer driver into the printer control program memory included in the newly created printer configuration information memory 33300 (S203). In the second exemplary embodiment, a standard driver is installed. Alternatively, a dedicated driver may be installed. This driver may be either stored in the memory (PC) 33000 in advance, or acquired via an electrical communication line. Alternatively, the driver may be provided while being stored on a computer readable information storage medium.

Processes S202 and S203 may be processes S108 and S109 executed in the printer setup program described above with reference to the first exemplary embodiment. In that case, the print job monitoring program may be configured to first call up the printer setup program, and after executing a series of processing, return to the print job monitoring program without executing S110.

Next, the controller (PC) 34000 updates the print queue status memory 33322, and suspends a print queue status (S204). This is because if the status is left as print ready, a situation may arise in which a print request is issued to a printer for which a printer port has not been designated, causing malfunction.

Then, the controller (PC) 34000 continuously monitors a print job for a print queue in the multifunction machine 200 (S205). This ends the preparation stage of the print job monitoring program.

Figure 7:
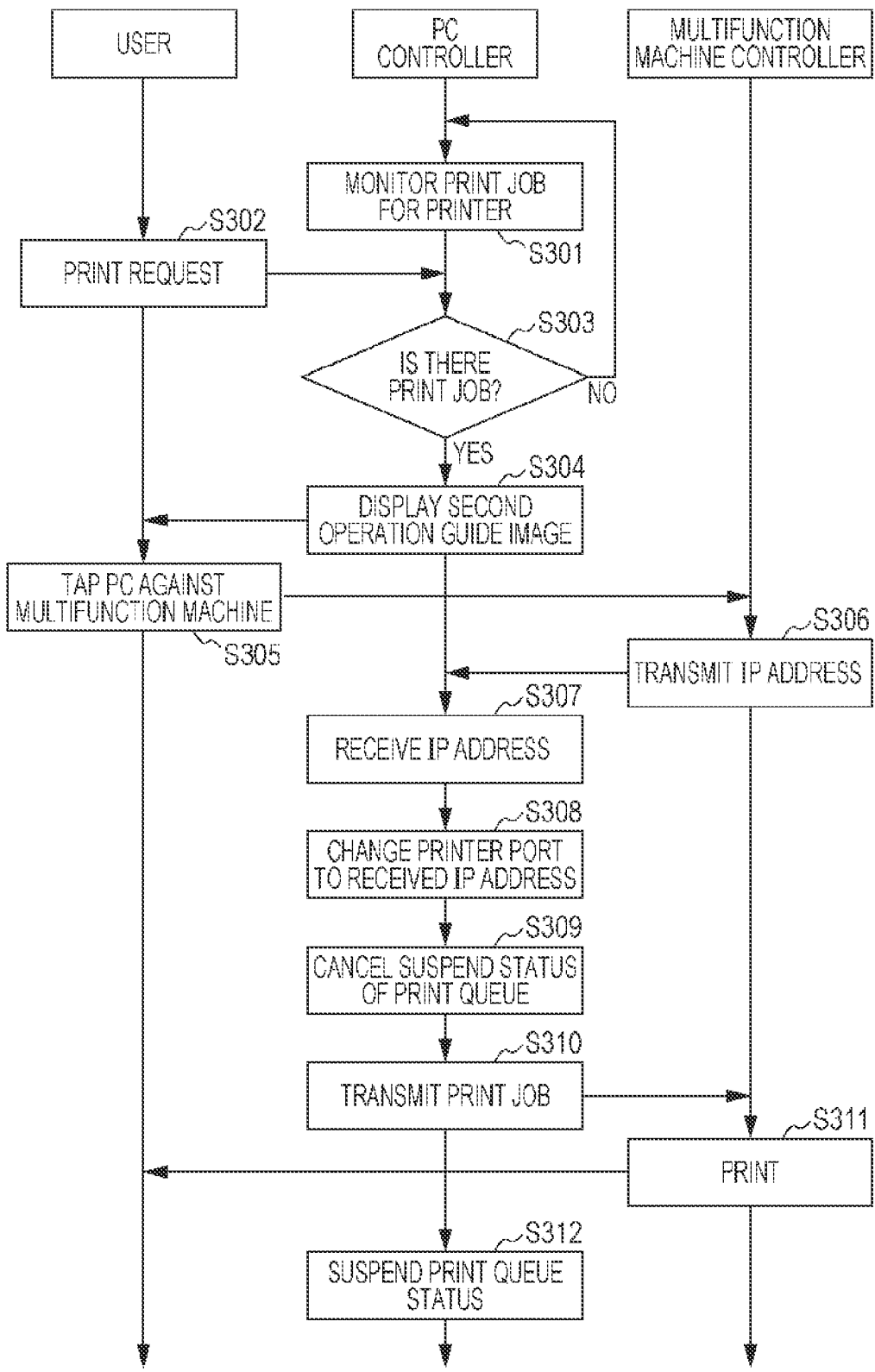
FIG. 7 is a flowchart illustrating an example of program processing in the image forming system according to the second exemplary embodiment of the invention.

FIG. 7 illustrates a flow of processing that constitutes the principal functions of the print job monitoring program. As described above with reference to the preparation stage of the print job monitoring program, the controller (PC) 34000 monitors a print job (S301), and continues the monitoring in a case where there is no print job (S303).

Thereafter, when a print request is made by the user operating the input unit (PC) 35000 (S302), the controller (PC) 34000 senses a print job related to the request (S303), thereby exiting the monitoring loop. For example, this request is executed in a Web browser, a document creation application, or the like that operates on the OS of the PC 30000. The request is made for the purpose of outputting a document in the form of printing the document on a piece of paper or the like.

In a case where there is a print job (S303), the controller (PC) 34000 uses the display (PC) 35000 to display a second operation guide image 40b (S304).

Figure 8:
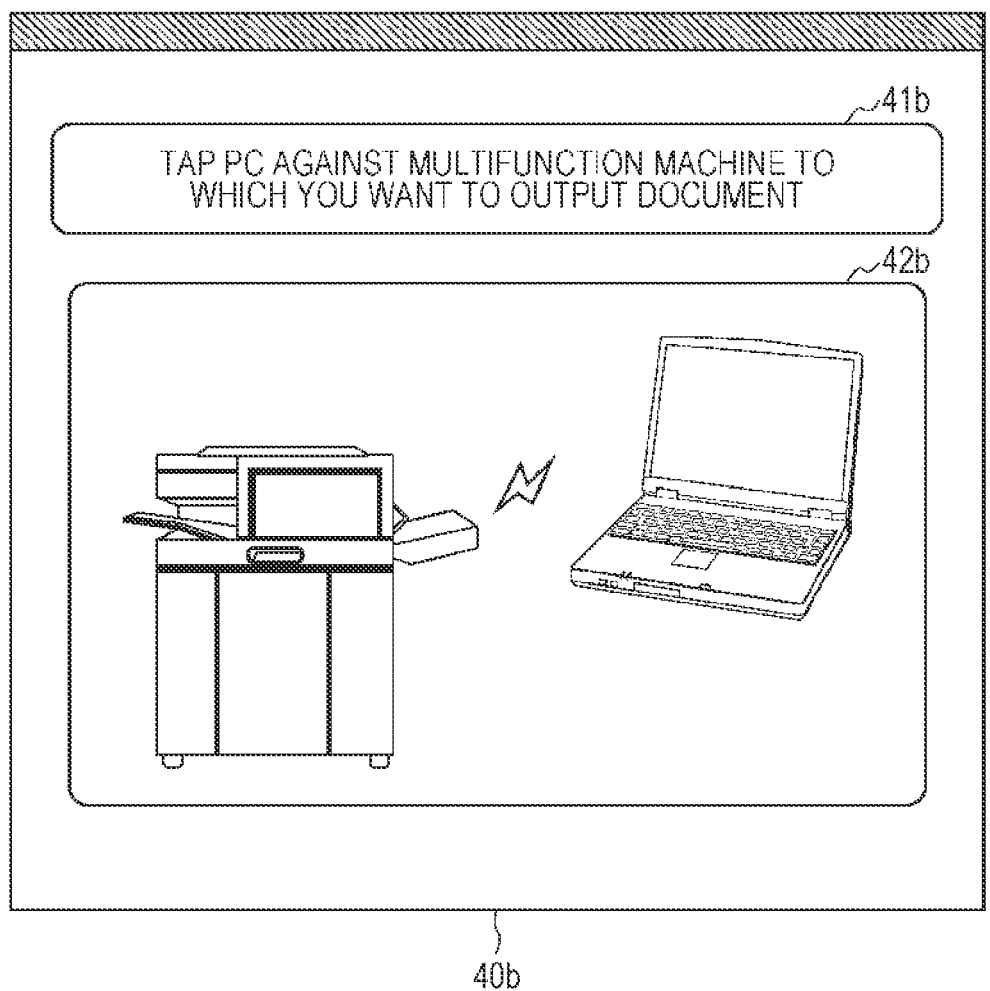
FIG. 8 illustrates an example of display of an operation guide image according to the second exemplary embodiment of the invention.

FIG. 8 illustrates the second operation guide image 40b. The second operation guide image 40b includes a second message display window 41b, and a second operation guide display window 42b. In the second exemplary embodiment, the letters "Tap the PC against the multifunction machine to which you want to output the document" are displayed in the second message display window 41b, and a drawing indicative of this instruction is displayed in the second operation guide display window 42b.

After seeing this guide image, the user taps the PC 30000 against the multifunction machine 200 (S305). At this time, it is necessary for the user to know where the NFC transceiver (PC) 32000 and the NFC transceiver (multifunction machine) 270 are mounted. Accordingly, visibility of those transceivers by the user may be enhanced by, for example, causing the corresponding portions to emit light.

Once communication by NFC becomes possible, the controller (multifunction machine) 230 transmits an IP address assigned to the network connector (multifunction machine) 260 by the NFC transceiver (multifunction machine) 270 (S306).

The transmitted IP address is received by the NFC transceiver (PC) 32000 (S307). At this time, as in the first exemplary embodiment, the NFC transceiver (PC) 32000 may emit sound or light to inform the user of completion of the reception. In a case where the reception fails, the NFC transceiver (PC) 32000 may notify the user to that effect.

As in the first exemplary embodiment, it is also possible to receive an IP address by tapping an NFC device of, for example, a card type against the multifunction machine 200, store the IP address into a memory provided in the NFC device, and thereafter tap the NFC device against the PC 30000 so that the NFC transceiver (PC) 32000 receives the IP address.

Next, the controller (PC) 34000 updates the printer port memory 33321 included in the printer configuration information memory 33300 created in the preparation stage of the print job monitoring program, and changes the print port to the received IP address (S308).

Thereafter, the controller (PC) 34000 updates the print queue status memory 33322, and changes the print queue status that has been suspended to a print-ready status (S309).

Then, the controller (PC) 34000 transmits a print job for which the print request (S302) has been made, to the multifunction machine 200 via the network from the network connector (PC) 31000 (S310). In the second exemplary embodiment, this transmission process is executed in accordance with a procedure defined by so-called TCP/IP. For this reason, the above-mentioned IP address is necessary. An implementation using a different communication protocol may be executed, in which case information transmitted and received by NFC may be set as identification information defined by the protocol.

Upon receiving a print job via the network connector (multifunction machine) 260, the controller (multifunction machine) 230 of the multifunction machine 200 executes a print for the job by using the printer unit 212 (S311). As a result, the user acquires the output of the job as printed on a piece of paper or the like.

Lastly, the controller (PC) 34000 updates the print queue status memory 33322, and suspends the print queue status (S312). Thereafter, the controller (PC) 34000 may either return to the monitoring of a print job (S301), or end the print job monitoring program.

In this way, setup of a printer or the like, and setting of a printer to which to output a document according to the exemplary embodiments are executed.

Exemplary embodiments of the invention are not limited to those mentioned above. For example, in a case where a facsimile function is included in the multifunction machine 200, it is necessary to install a facsimile driver in order to use the function from the PC 30000. Accordingly, a facsimile driver may be installed in the first exemplary embodiment.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A system comprising:
   a processing apparatus; and
   an information apparatus,
   wherein the processing apparatus includes a first communication unit comprising a first transceiver, the first transceiver configured to transmit identification information of the processing apparatus to the information apparatus, and
   wherein the information apparatus includes
      a second communication unit comprising a second transceiver configured to, in response to the second transceiver coming into physical contact with the first transceiver or within a range of several tens of centimeters with the first transceiver, receive the identification information transmitted by the first transceiver, the identification information being information that identifies the processing apparatus to which the information apparatus transmits a job,
   wherein
   the processing apparatus further includes a third communication unit comprising a third transceiver, the third transceiver configured to receive the job via a communication protocol different from a communication protocol of the first transceiver, and
   the information apparatus further includes a fourth communication unit comprising a fourth transceiver, the fourth transceiver configured to, in response to the information apparatus canceling a suspend state of a print queue including the job, transmit the job to the third transceiver via a communication protocol different from a communication protocol of the second transceiver, by using an installed driver for controlling the processing apparatus corresponding to the identification information.

2. The system according to claim 1,
wherein the first transceiver and the second transceiver each include a short-range radio communication transceiver.

3. A system comprising:
a processing apparatus; and
an information apparatus,
wherein the processing apparatus includes
    a first communication unit comprising a first transceiver configured to transmit identification information to the information apparatus, the identification information being destination information of image data transmitted to the processing apparatus, and
    a third communication unit comprising a third transceiver configured to receive image data, the third transceiver using a communication protocol different from a communication protocol of the first transceiver,
wherein the information apparatus includes
    a second communication unit comprising a second transceiver configured to, in response to the second transceiver coming into physical contact with the first transceiver or within a range of several tens of centimeters with the first transceiver, receive the identification information transmitted by the first transceiver, the identification information being information that identifies the processing apparatus to which the information apparatus transmits the image data, and
    a fourth communication unit comprising a fourth transceiver configured to, in response to the information apparatus canceling a suspend state of a print queue including the image data, transmit the image data to the processing apparatus corresponding to the identification information received by the second transceiver, the fourth transceiver using a communication protocol different from a communication protocol of the second transceiver.

4. The system according to claim 3,
wherein the information apparatus further includes
    a processing apparatus detector configured to detect the processing apparatus corresponding to the identification information, and
    a driver installing unit comprising a processor configured to install a driver for controlling the processing apparatus detected by the processing apparatus detector.

5. The system according to claim 3, wherein:
the information apparatus further includes an image data sensor, the image data sensor monitoring and sensing transmission of image data to the processing apparatus;
the identification information is an IP address; and
in a case where the image data is sensed by the image data sensor, the image data is transmitted by the fourth transceiver to a destination corresponding to the IP address.

6. The system according to claim 3,
wherein the first transceiver and the second transceiver each include a short-range radio communication transceiver.

7. The system according to claim 4,
wherein the first transceiver and the second transceiver each include a short-range radio communication transceiver.

8. The system according to claim 5,
wherein the first transceiver and the second transceiver each include a short-range radio communication transceiver.

9. A non-transitory computer readable medium storing a program causing a computer to execute a process, the process comprising:
    receiving, in response to an information apparatus coming into physical contact with a processing apparatus or within a range of several tens of centimeters with the processing apparatus, identification information of the processing apparatus transmitted by the processing apparatus, via a first communication protocol, the identification information being information that identifies the processing apparatus to which the information apparatus transmits image data; and
    transmitting, in response to the information apparatus canceling a suspend state of a print queue including the image data, the image data via a second communication protocol different from the first communication protocol.

10. The system according to claim 1, wherein the third transceiver and the fourth transceiver are configured to perform communication faster than the first transceiver and the second transceiver.

11. The system according to claim 1,
wherein the first communication unit causes the information apparatus to emit light in response to the information apparatus completing reception of the identification information of the processing apparatus.

12. The system according to claim 3,
wherein the first communication unit causes the information apparatus to emit light in response to the information apparatus completing reception of the identification information of the processing apparatus.

13. The non-transitory computer readable medium according to claim 9,
wherein the process further comprises informing a user of completion of the receiving the identification information by emitting a light at an information apparatus.

* * * * *